RELAY TACHOMETER AND ANALOG MULTIPLIER CIRCUIT

Filed Aug. 2, 1961 2 Sheets-Sheet 1

*INVENTOR.*
WALTER HOCHWALD
LARRY R. MILLSAP
*BY* Allan Rothenberg
ATTORNEY

*INVENTORS*
WALTER HOCHWALD
LARRY R. MILLSAP
*BY*

ATTORNEY

United States Patent Office 3,163,751

Patented Dec. 29, 1964

3,163,751

RELAY TACHOMETER AND ANALOG MULTIPLIER CIRCUIT

Larry R. Millsap, South Gate, and Walter Hochwald, Downey, Calif., assignors to North American Aviation, Inc.

Filed Aug. 2, 1961, Ser. No. 128,751
10 Claims. (Cl. 235—194)

This invention relates to computational means and more particularly to an analog computer device.

The electronic computer art has provided many useful multiplier circuits for achieving a signal indicative of the product of two factors. The mechanizations so provided comprise several general schemes, including (1) a combination of amplitude and/or time modulation of pulses in a fixed pulse repetition rate vacuum tube circuit, (2) feedback circuit arrangements in combination with high-gain amplifiers, (3) combinations of digital counters and switches referred in the digital computer art as step-multipliers, and (4) balanced modulators wherein the amplitude of the sum frequency of several signals represents the product sought. However, none of these devices are adapted to providing concurrently a plurality of products, wherein each product represents a different combination of a plurality of parameters multiplied by a common factor. Further, the devices of the prior art appear to be relatively sophisticated and complex, and do not readily lend themselves to extreme simplification. Such extreme simplification is achievable by employing the average current of a resistor in a charging or discharging relationship with a capacitor.

In accordance with a preferred embodiment of this invention, there is provided analog computing means for concurrently multiplying each of a plurality of factors by an additional factor, each factor of said plurality of factors representing a different algebraic combination of four parameters. Such computing means includes four switching circuits, each comprising an analog signal source connected to one terminal of a switch and a resistor interposed in series circuit with said switch and analog signal source. The other terminal of two of said switches is commonly connected to one plate of a capacitor, the other terminal of the other two of said switches being commonly connected to another plate of said capacitor. There is also provided an analog switching frequency signal source for switching said switches, and quadrature time-phase means interposed between said switches and said switching signal for providing a time-phase quadrature relationship between said switches. The value of the capacitor is selected such that the R-C time constant formed by such capacitor and any one of said resistors is substantially less than either one-fourth the shortest period of the frequency at which the switches are switched, or the period of any transients in the analog signal source.

With the above described arrangement, the average current through any one of the resistors is indicative of the product of the switching frequency and an algebraic combination of the four analog signal voltages appearing in circuit with the capacitor during a given switching cycle. Such average current through the resistor may be deduced from the average voltage drop occurring across that resistor. The particular combination of the analog signal voltages is itself a function of the particular resistor selected for consideration. In this way, a variety of arithmetical relationships between a plurality of parameters may be computed simultaneously by a single simple computing device without necessitating the rearrangement thereof.

An object of this invention, therefore, is to provide analog means for multiplying two signals representing two factors for which a product is sought.

Another object of this invention is to provide analog multiplier means utilizing the average current through a resistor in a charging or discharging circuit relation with a capactior.

A further object of this invention is to provide analog means for multiplying one of a plurality of analog voltages by an analog frequency each analog representing one of two factors the product of which is sought to be determined as a function of time.

Yet a further object of this invention is to provide simple and reliable analog means for combining and multiplying a plurality of analog signals.

These and further objects of this invention will become apparent from the following description taken in connection with the accompanying drawings in which.

In the drawings, like reference characters refer to like parts.

Figure 1:
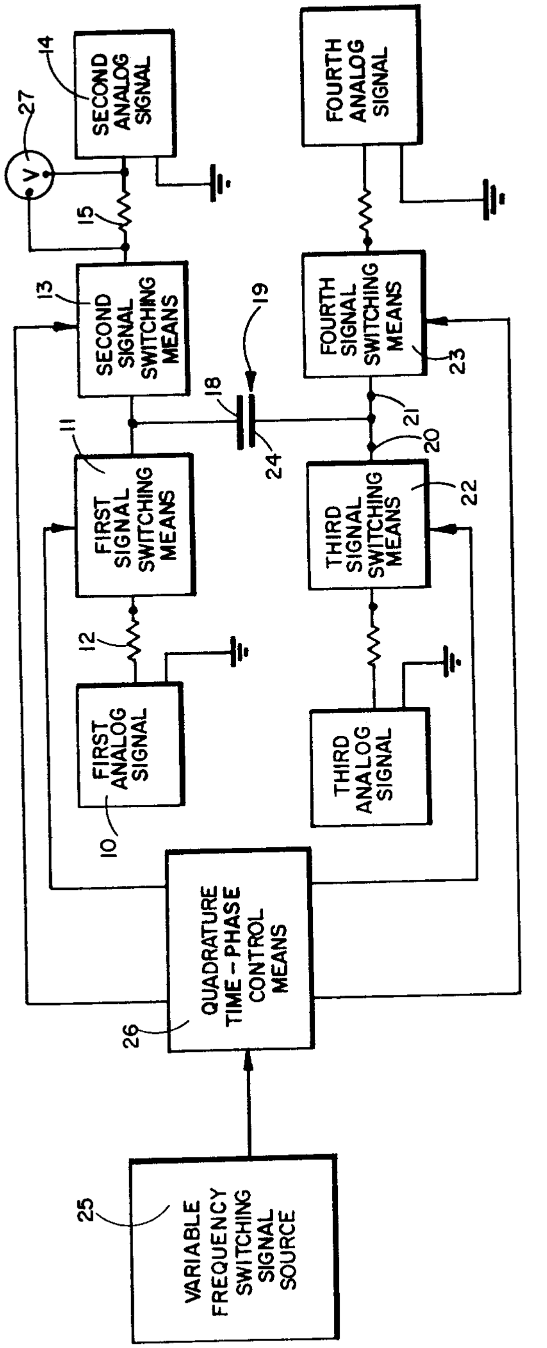
FIG. 1 is a block diagram of a system embodying the principles of this invention.

Referring to FIG. 1, a block diagram of a device embodying the principles of the invention is illustrated. There is provided a first circuit comprising a first analog signal source 10 connected to one of two switching terminals of a first signal switching means 11, and a first resistor 12 interposed in series circuit with said first signal and first switch. A second circuit comprises a second analog signal 13, second signal switching means 14, and second resistor 15 similarly connected in series. The second switching terminals 16 and 17 of signal switching means 11 and 13 respectively are commonly connected to a first plate 18 of a capacitor 19. Third and fourth circuits are provided, comprising like components arranged similarly to those of the first and second circuits but with the second terminals 20 and 21 of third and fourth switching means 22 and 23 respectively being commonly connected to a second plate 24 of capacitor 19.

Figure 5:
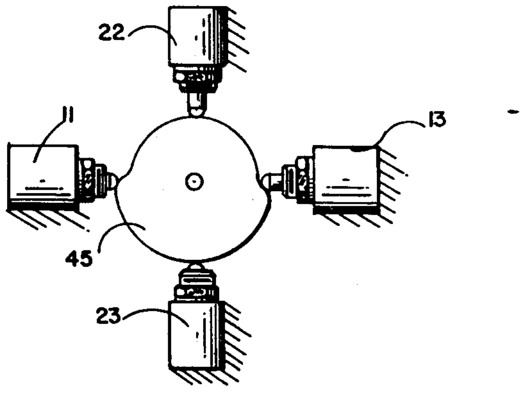
FIG. 5 is an illustration of a preferred embodiment of the invention.

A variable frequency switching signal source 25 is operatively connected to the signal switching means 11, 13, 22 and 23 for operation of such switching means at the controlling frequency of such signal source. The description of a typical variable frequency switching signal source 25 may be found in an article entitled, "High Square Variable Frequency Multivibrator" by William J. Mattox II, in Electronic Equipment Engineering, page 35, July 1961. Interposed between such switching means and switching signal source 25 is a quadrature time-phase control means for controlling the operation of each of switches 11, 13, 22 and 23 in quadrature time-phase relationship to the others. Quadrature time-phase control means 26 may be, for example, of the kind shown and described in "Use Thyratrons to Control Higher Power A.-C. Servomotors," by E. Taylor and J. Burnett, Control Engineering, pages 118–122, April 1959. Note that the cam of FIG. 5 is a quadrature time-phase control means. A variable speed motor driving cam 45 is a variable frequency switching signal source 25. Means for indicating a measure of the average current flow through any one of the four resistors of interest is placed in circuit with that resistor for which a measure of the average current flow is desired. For example, a time-averaging voltmeter 27, of a type well known in the art, may be connected across the two terminals of second resistor 13 to provide a measure of the average current flow through resistor 13.

Figure 2:
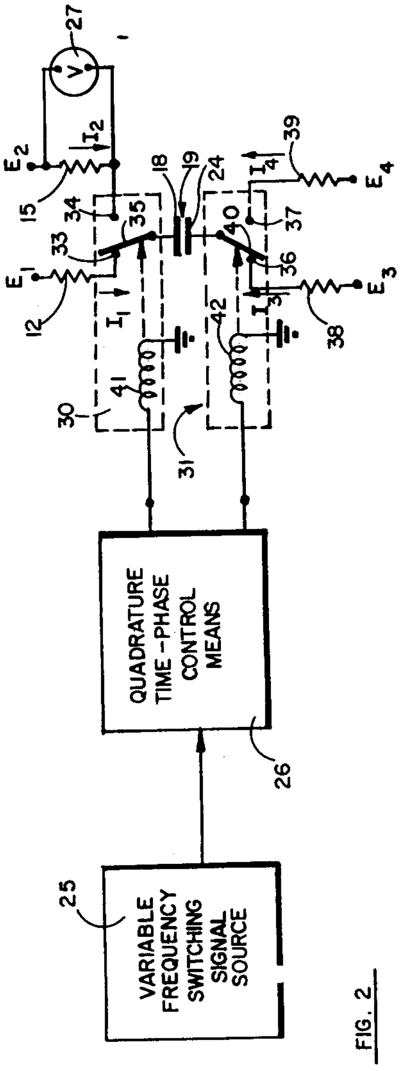
FIG. 2 is an illustration of an exemplary embodiment of this invention.

Referring to FIG. 2, an exemplary embodiment of the invention is shown. First and second single-pole double-throw relays 30 and 31 are provided. There is also provided first, second, third and fourth analog signal voltages $E_1$, $E_2$, $E_3$, and $E_4$. First and second analog voltages $E_1$ and $E_2$ are operatively connected to first and second switching terminals 33 and 34 respectively of first relay 30 by means of first and second resistors 12 and 15 respectively. Armature 35 of first relay 30 is connected in circuit to plate 18 of capacitor 19.

Third and fourth analog signal voltages $E_3$ and $E_4$ are operatively connected to first and second switching terminals 36 and 37 respectively of second relay 31 by means of resistors 38 and 39 respectively. Armature 40 of second relay 31 is connected in circuit to second plate 24 of capacitor 19. Solenoids 41 and 42 of relays 30 and 31 respectively are responsively connected to a variable frequency switching signal source 25 for driving such relays at the frequency of signal source 25. Interposed between signal source 25 and relays 30 and 31 is a quadrature time-phase control means 26 for providing a quadrature time-phase relationship between relays 30 and 31.

In the operation of the exemplary device of FIG. 2, the frequency of signal source 25 represents an analog of one of several factors to be multipled and constitutes the switching frequency at which relays 30 and 31 are to be driven. Control means 26 modifies the switching signal from signal source 25 to provide two separate square wave switching signals, one to each of relays 30 and 31, each signal being in quadrature time-phase or 90 degree phase relation to the other. Hence, armatures 35 and 40 of relays 30 and 31 respectively are driven at the signal frequency of source 25 and in a quadrature time-phase relationship to each other. Each armature is driven from one of its two contact points to the other at half cycle intervals or 180 degrees of phase, there being a concurrence of one of the two switching states of one relay with one of the two states of the other for approximately a one-quarter cycle interval or 90 degrees of phase. In this way, the several analog voltages appear in various circuit combinations with capacitor 19 by means of the associated circuit resistors, to cause various charging or discharging transient currents to flow through such resistors during a given cycle of operation.

If the period of the frequency at which the relays are driven is substantially greater than either one-fourth the lowest R-C time constant associated with charging and discharging capacitor 19 or the period of any transients in the analog signal voltage, then the average current through a given resistor may be expressed by the following relationship:

$$I\ \text{avg}=ECf \qquad (1)$$

where:

$E$=magnitude of charging/discharging analog voltage in circuit with such resistor during a given cycle
$C$=capacitance of capacitor 19
$f$=relay frequency of signal source 25

Such expression is derived from the expression for the charge, Q on a capacitor of capacitance C due to a charging voltage E:

$$Q=CE \qquad (2)$$

But, the charge Q is also defined as the integral of the charging current $i$ with respect to time:

$$Q=\int idt \qquad (3)$$

Therefore, substituting Eq. 3 for Q in Eq. 2:

$$\int idt=CE \qquad (4)$$

Now, the expression for the time averaged current over an interval of time $t$ may be expressed as follows:

$$I_{\text{avg}}=\frac{\int_0^t idt}{\int_0^t dt}=\frac{\int_0^t idt}{\Delta t} \qquad (5)$$

Substituting Equation 4 in the numerator expression of Eq. 5 and letting the term $\Delta t$ represent the period of a switching frequency $f$, Equation 5 reduces to the expression of Equation 1.

The sense, as well as the magnitude, of the average current through a given one of the four resistors of FIG. 2 is a further function of the four analog voltages applied and the phase sense (e.g., lead or lag) at which relay 30 is driven relative to relay 31.

Utilizing the relationship of Equation 1, and designating $I_1$, $I_2$, $I_3$, $I_4$ as the currents flowing through resistors 12, 15, 38 and 39 respectively of FIG. 2, the following equations can be written for the circuit shown in FIG. 2. Assuming that relay 31 leads relay 30 by 90 degrees:

$$\left.\begin{aligned} I_1\ (\text{avg})&=(E_1+E_3-E_4-E_2)Cf\\ I_2\ (\text{avg})&=(E_2+E_4-E_3-E_1)Cf\\ I_3\ (\text{avg})&=(E_3+E_2-E_1-E_4)Cf\\ I_4\ (\text{avg})&=(E_4+E_1-E_2-E_3)Cf \end{aligned}\right\} \qquad (6)$$

Assuming that relay 31 lags relay 30 by 90 degrees:

$$\left.\begin{aligned} I_1(\text{avg})&=(E_1+E_4-E_3-E_2)Cf\\ I_2(\text{avg})&=(E_2+E_3-E_4-E_1)Cf\\ I_3(\text{avg})&=(E_3+E_1-E_2-E_4)Cf\\ I_4(\text{avg})&=(E_4+E_2-E_1-E_3)Cf \end{aligned}\right\} \qquad (7)$$

Figure 4:
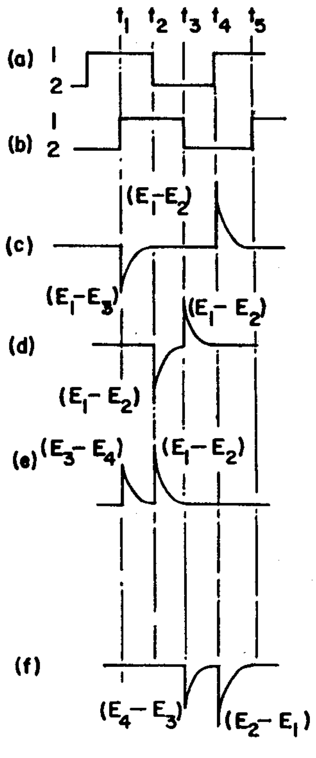

The validity of the relationship indicated by Equations 6 and 7 can be seen from an analysis of the transient current flow through each resistor for one complete cycle of operation of the embodiment of FIG. 4.

Figure 3:
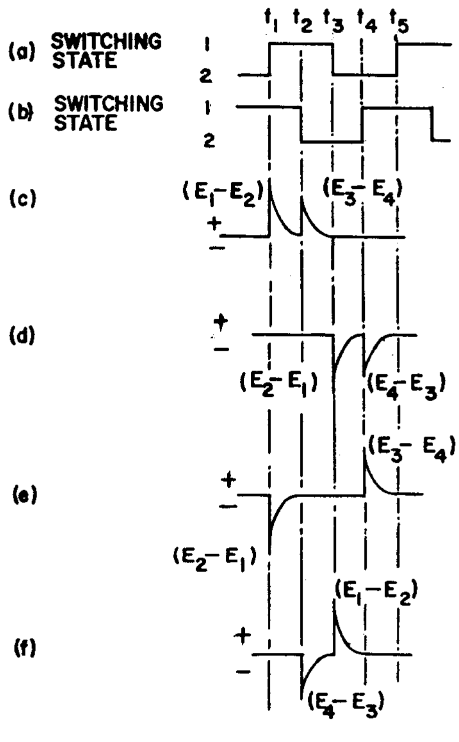
FIGS. 3 and 4 are illustrations of the voltage wave forms associated with one cycle of operation of the device of FIG. 2.

Referring to FIGS. 3 and 4, there are illustrated two sets of voltage waveforms associated with one cycle of operation of the exemplary device of FIG. 2. For purposes of convenience in exposition, it is assumed that the voltages $E_1$, $E_2$, $E_3$ and $E_4$ are of like sense relative to ground potential, and that $E_1$ is greater than $E_2$ and that $E_3$ is greater than $E_4$ in magnitude. One set of voltage waveforms is shown in FIG. 3 for an operational mode wherein second relay 31 leads first relay 30 by 90 degrees of phase, and a second set of voltage waveforms is shown in FIG. 4 for an operational mode in which second relay 31 lags first relay 30 by 90 degrees. Each of two switching states for each switch is seen to exist for an interval of 180 degrees or one-half of a cycle, while the change in state of one switch relative to another is seen to occur in quadrature or a quarter of a cycle apart. FIGS. 3($a$) and 3($b$) represent the square wave driving signals to, or the switching states of, relay 30 and 31, respectively. FIGS. 3($c$), 3($d$), 3($e$) and 3($f$) represent the voltage waveforms appearing across resistors 12, 15, 38, and 39, respectively, due to currents $I_1$, $I_2$, $I_3$, and $I_4$. Current flow through a particular resistor to its associated switch contact point is designated as positive flow. The reference voltages indicated at the peaks of each described transient refer to the signal voltage combination of which such peak is a function, and do not refer to the absolute magnitude of the peak, itself. The magnitude of the voltage transient in a given resistor is equal to the indicated reference voltage multiplied by a constant of proportionality. The constant of proportionality is equal to the ratio of the resistance of the resistor of interest to the sum of the resistances of the resistor of interest and that resistor appearing in series circuit with the resistor of interest during the quarter cycle in which such transient occurs. For ease of calibration, the resistances of all four resistors are made equal to each other. Hence, the constant of proportionality is one-half. For convenience in exposition, representation of the constant of proportionality has been omitted.

Examining the operational mode wherein second relay 31 leads first relay 30 (FIG. 3), let us designate the connection of armature 35 with contact 33 and the connection of armature 40 with contact 36 as a first switching state for relays 30 and 31, respectively. Referring further to FIG. 3, if second relay 31 is viewed in the first state (FIG. 3(*b*)), first relay 30 is observed to subsequently switch to the first state at a point in time $t_1$ (FIG. 3(*a*)). At such change of state of relay 30, no transient current $I_2$ flows in resistor 15 (FIG. 3(*d*)) because it is open circuited. Therefore, no voltage drop occurs across resistor 15. (No voltage drop existed across resistor 15 before the instant of switching due to zero current flow through resistor 15 in the steady state.) Also no transient current $I_4$ flows in resistor 39 (FIG. 3(*f*)), because its open-circuit state has not been changed by the switching of relay 30. However, at $t_1$ a transient current $I_1$ is made to flow in resistor 12 (FIG. 3(*c*)) due to resistor 12 being changed from an open circuit condition to a closed circuit in series with $E_1$ opposed by $E_3$. The average IR drop $V_{R_1}$ occurring across resistor 12 will be a function of the difference between the steady-state charge on plate 18 of capacitor 19 $(E_2-E_3)$ and the applied voltage upon switching $(E_1-E_3)$:

$$V_{R_1}\alpha(E_1-E_3)-(E_2-E_3)=(E_1-E_2)$$

Similarly, a transient current $I_3$ is made to flow in resistor 38 (FIG. 3(*e*)) due to a change in the total potential in circuit with such resistor. The average IR drop $V_{R_3}$ across resistor 38 will be a function of the difference between the steady-state charge on plate 24 of capacitor 19 $(E_1-E_3)$ and the applied voltage upon switching $(E_3-E_1)$:

$$V_{R_3}\alpha(E_3-E_1)-(E_3-E_2)=(E_2-E_1)$$

The steady-state charge upon capacitor 19 after switching will be equal to the difference between the applied voltages $E_1$ and $E_3$.

At $t_2$ (occurring a quarter of a cycle after $t_1$), second relay 31 switches to the second state. Upon such change of state of relay 31, no transient current $I_3$ flows in resistor 38 (FIG. 3(*e*)) because it is open circuited. Therefore, no voltage drop occurs across resistor 38. (No voltage drop existed across resistor 38 before the instant of switching due to the subsidence of prior transients.) Also, no transient current $I_2$ flows in resistor 15 (FIG. 3(*d*)) because its open-circuit state has not been changed by the switching of second relay 31. However, a transient current $I_4$ is made to flow in resistor 39 (FIG. 3(*f*)) due to resistor 39 being changed from an open circuit condition to a closed resistor 39 will be a function of the difference between the steady-state charge on plate 24 of capacitor 19 $(E_3-E_1)$ and the applied voltage upon switching $(E_4-E_1)$:

$$V_{R_4}\alpha(E_4-E_1)-(E_3-E_1)=(E_4-E_3)$$

Similarly, a transient current $I_1$ is made to flow in resistor 12 (FIG. 3(*c*)) due to a change in the total potential in circuit with such resistor. The average IR drop $V_{R_1}$ across resistor 12 will be a function of the difference between the steady-state charge on plate 18 of capacitor 19 $(E_1-E_3)$ and the applied voltage upon switching $(E_1-E_4)$:

$$V_{R_1}\alpha(E_1-E_4)-(E_1-E_3)=(E_3-E_4)$$

The steady-state charge upon capaictor 19 after switching will be equal to the difference between the applied voltages $E_1$ and $E_4$.

At $t_3$, first relay 30 switches to the second state. Upon such change of state of relay 30, no transient current $I_1$ flows in resistor 12 (FIG. 3(*c*)) because it is open circuited. Therefore, no voltage drop occurs across resistor 12. Also, no transient current $I_3$ flows in resistor 38 (FIG. 3(*e*)) because its open-circuit state has not been changed by the switching of first relay 30. However, a transient current $I_2$ flows in resistor 15 (FIG. 3(*d*)) due to resistor 15 being changed from an open circuit condition to a closed circuit in series with $E_2$ opposed by $E_4$. The average IR drop $V_{R_2}$ across resistor 15 will be a function of the difference between the steady-state charge on plate 18 of capacitor 19 $(E_1-E_4)$ and the applied voltage upon switching $(E_2-E_4)$:

$$V_{R_2}\alpha(E_2-E_4)-(E_1-E_4)=(E_2-E_1)$$

Similarly, a transient current $I_4$ flows in resistor 39 (FIG. 3(*f*)) due to a change in the total potential in circuit with such resistor. The average IR drop $V_{R_4}$ across resistor 39 will be a function of the difference between the steady-state charge on plate 24 of capacitor 19 $(E_4-E_1)$ and the applied voltage upon switching $(E_4-E_2)$:

$$V_{R_4}\alpha(E_4-E_2)-(E_4-E_1)=(E_1-E_2)$$

The steady-state charge upon capacitor 19 after switching will be equal to the difference between the applied voltages $E_2$ and $E_4$.

At $t_4$, second relay 31 switches to the first state. By a parity of reasoning it is to be appreciated that the average values of $V_{R_1}$, $V_{R_2}$, $V_{R_3}$, and $V_{R_4}$ are functions of zero, $(E_3-E_4)$, $(E_4-E_3)$ and zero respectively, while the steady-state voltage on capacitor 19 is $(E_2-E_4)$.

At $t_5$, first relay 30 switches to the second state, thereby completing one cycle of operation and starting a second cycle. Summing the voltages appearing in circuit with each resistor and capacitor 19 over the period of one cycle:

| Quarter Cycle | Resistor 12 | Resistor 15 | Resistor 38 | Resistor 39 |
|---|---|---|---|---|
| 1 | $E_1-E_2$ | 0 | $E_2-E_1$ | 0 |
| 2 | $E_3-E_4$ | 0 | 0 | $E_4-E_3$ |
| 3 | 0 | $E_2-E_1$ | 0 | $E_1-E_2$ |
| 4 | 0 | $E_4-E_3$ | $E_3-E_4$ | 0 |
| | $E_1+E_4-E_3-E_2$ | $E_2+E_4-E_3-E_1$ | $E_2+E_3-E_4-E_1$ | $E_1+E_4-E_3-E_2$ |

Such sums indicate the combination of signals applied across each resistor during the period of one cycle. By the theorem of superposition, it is to be appreciated that the contribution to the average current flow through a given resistor is a function of each of the signal voltages applied in circuit with such resistor and capacitor 19. In other words, the combination of applied signal voltages appearing in circuit with a particular resistor in a charging or discharging relation is determinative of the average current through such resistor. Therefore, the average voltage drop across a particular resistor for a given cycle caused by the current flow in such resistor, is a function of the combination of signal voltages applied during that cycle.

A similar analysis may be employed to verify the expressions of Equation 3 for the case where phase A leads phase B as shown in FIG. 4.

Referring to FIG. 5, a preferred embodiment of the signal switching means 11, 13, 22 and 23 and quadrature time phase control means 26 of FIG. 1 is shown. The signal switching means is comprised of spring loaded switches 11, 13, 22 and 23, arranged in space-quadrature relation about a rotary cam 45 and operatively cooperating with such cam. In such arrangement, first and second switches 11 and 13 are diametrically spaced apart, and third and fourth switches 22 and 23 are interposed therebetween. Cam 45 is comprised of two sectors of equal angular extent and of constant radius, the radius of one sector being larger than the other. In other words, the radius of the cam as a function of the rotation of the cam describes a single square wave for each complete rotattion. It is to be appreciated that in operation cam 45 is responsively connected to a variable speed source of rotary motion which provides the variable frequency signal source 25 of FIG. 1. Further, in the alternate switching of the two pairs of switches by cam 45, switches 11 and 13 of FIG. 5 correspond to contact points 33 and 34 respectively of first relay 30, and switches 22 and 23 correspond to contact points 36 and 37 respectively of second relay 31 of FIG. 2. Therefore, as the discontinuity between the two sectors of the cam 45 is rotated past a set of opposing switches, say first switch 11 and second switch 13, one switch of said pair is switched to an "ON" state and the other to an "OFF" state. In other words, the particular state of each two-state switch of a given pair of opposing switches occurs to the mutual exclusion of that state in the other switch. For any frequency or angular speed of rotation of cam 45 the space-quadrature relation of the positions of switches 14, 13, 22 and 23 correspond to a time phase quadrature relation. Therefore, as the cam is caused to rotate in a given direction, it is to be appreciated that one pair of opposing switches is switched in time-phase quadrature relation to the other pair. For example, if cam 45 of FIG. 5 is rotated in a clockwise direction, the raised portion of cam 45 will operatively engage each of first, third, second and fourth switches 11, 22, 13 and 23 in the sequence named, and corresponding in FIG. 2 to that case where first relay 30 leads second relay 31.

One useful application of the device of FIG. 5 has been as a tachometer which provides an output average current of a magnitude proportioned to the rotational velocity of a shaft which drives cam 45. In such application, second, third and fourth analog signal voltages $E_2$, $E_3$ and $E_4$ are made equal to ground potential, and a fixed potential above ground potential is employed for $E_1$. Since frequency or switching speed is then the only variable parameter in the equation, $I\ \text{avg}=Ecf$, the average current in resistor 12 is indication of the magnitude of the frequency $f$. Where the voltage source $E_1$ is also allowed to represent an analog of a second variable parameter, then the average current through resistor 12 is an analog of the product of the two parameters so represented, in the manner of a simple multiplier. However, by means of the arrangement shown in FIG. 1, several parameters may be summed in several algebraic combinations and the combinations multiplied by a factor representing another variable parameter. In such arrangement, frequency or rotational speed of the cam represents an analog of one parameter, and the voltages $E_1$, $E_2$, $E_3$, and $E_4$ represent analogs of parameters to be combined for multiplications, the particular combination of such voltages being determined by the particular resistor selected for measurement. In other words, of the plurality of combinations of parameters available, the combination sought to be employed determines the resistor which is to be measured or instrumented.

Several mathematical operations can be performed by means of the illustrated device, by making a proper selection of the available parameters:

(1) $XY$ and $-XY$, concurrently,
(2) $X(Y-Z)$ and $-X(Y-Z)$, concurrently, and
(3) $X(Y-Z)+|X|W$, wherein any parameter or variable may be either negative or positive.

For example, in the expression for $I_1$ in Equations 6 and 7, let a phase lag and phase lead (corresponding to $(+)Cf$ and $(-)Cf$, respectively) represent the term X, let $E_3$ represent the term Y, and let all other potential sources be grounded. It is to be seen that the product XY will reverse sign when either the phase (sign of X) or the sign of $E_3$ (sign of Y) reverse, but not when both reverse. Further, in the expression for $I_2$, the contribution due to $E_3$ is seen to be of opposite sense to that for $I_1$. Therefore, the products XY and $-XY$ are concurrently available from the device.

Similarly, in the expression for $I_1$ in Equations 6 and 7, let $E_4$ and $E_3$ represent the terms Y and Z, respectively, and let $E_1$ and $E_2$ be grounded. Then, it is to be seen that the expression for the average current $I_1$ is the product of X and the sum $(Y-Z)$, where the product changes sign as X changes sign (phase reversal of the switching frequency). Further, in the expression for $I_2$, the contribution due to $E_3$ and $E_4$ is seen to be of opposite sense to that for $I_1$. Therefore, the products $$X(Y-Z)$$

and $-X(Y-Z)$ are concurrently available from the device.

In a further application, it is to be observed from Equations 6 and 7 that the sense of the contribution of $E_2$ to the current $I_1$ is not affected by phase reversals of the switching frequency (e.g., is independent of the sign of X), as distinguished from $E_3$ and $E_4$. It is to be noted however, that the sense of $E_2$ may be either polarity. Therefore, it is possible to let $E_3$, $E_4$ and $E_2$ represent the terms Y, Z and W respectively (while grounding $E_1$), in order to mechanize the equation, $X(Y-Z)+|X|W$.

It will be seen that the device of this invention provides a simple, versatile means for performing a plurality of arithmetical operations.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A computer comprising a plurality of analog inputs, a capacitor, switching means for connecting opposite sides of said capacitor to different ones of said inputs, means for initiating successive operation of respective ones of said switching means at like frequency at successive instants mutually spaced by intervals equal to the period of said frequency divided by the number of said switching means, each said switch means having a duration of operation greater than one of said intervals, and output means for providing an indication of current flowing through one of said switching means.

2. A computer comprising a plurality of analog inputs, a capacitor, switching means for connecting opposite sides of said capacitor to different ones of said inputs, variable frequency means for initiating consecutive operation of respective ones of said switching means in a predetermined order at like frequency at successive instants mutually spaced by intervals equal to the period of said frequency divided by the number of said switching means, each said switch means having a duration of operation greater than one of said intervals, means comprising a further input to the computer for controlling the frequency of said variable frequency means, and output means for providing an indication of current flowing through one of said switch means.

3. Analog multiplier means comprising a single capacitor in circuit with a plurality of resistive switching circuits and a plurality of analog voltage sources for providing a current in each said circuit, means responsive to a switching frequency signal for switching said switching circuits at said frequency and in a predetermined time phase relationship, to cause each said current to be indicative of a product of said switching frequency and a combination of analog voltages from said sources.

4. Analog computing means comprising two pairs of resistive switching circuits driven in quadrature time-phase relationship to each other, a separate signal voltage source coupled with each said circuit, and a single common capacitor connected to establish a time-constant in each circuit which is less than one-fourth the shortest period of the switching frequency at which the switching circuits are driven, whereby the average current through a given resistive circuit in a charging or discharging relation with said capacitor is equal to the product of the capacitance of said capacitor, the switching frequency at which the circuits are switched, and the algebraic sum of the combination of applied voltages appearing in circuit with such capacitor during a given switching cycle.

5. Analog computing means for multiplying a first factor by a second factor, said second factor representing the algebraic sum of several parameters, said means comprising: four switching circuits, each circuit including switching means and a resistive element, variable drive means for driving said switching means at a common frequency in a time-phase quadrature relationship between said switching means, a single common capacitor connected to establish a time-constant in each said circuit which is less than one-fourth the shortest period of the switching frequency at which the switching means are driven, four separate signal voltage sources each coupled with a respectively different one of said circuits and each representing one of four parameters, whereby the average current through a given resistive element in a charging or discharging relation with said capacitor is proportional to the product of the switching frequency at which the switching means are driven and the algebraic sum of a combination of said signal voltage source appearing in circuit with said capacitor during a given cycle.

6. Analog computing means for concurrently multiplying each of a first, second, third, and fourth factor by a fifth factor, each of said first, second, third, and fourth factors representing a different algebraic combination of four parameters, said computing means comprising: four switching circuits, each circuit including switching means and a resistive element; variable frequency drive means for driving said switching means at a common frequency at successive quarter cycles of said frequency; a single capacitor connected to establish a time-constant in each said circuit which is less than one-fourth the shortest period of the switching frequency at which the switching means are driven; a separate signal voltage source connected to each of said circuits and representing one of four parameters, whereby the average current through a given resistive element in a charging or discharging relation with said capacitor is proportional to the product of the switching frequency at which the switching devices are driven and the algebraic sum of a combination of said applied voltages appearing in circuit with such capacitor during a given cycle.

7. Analog computing means for concurrently multiplying each of a first, second, third, and fourth factor by a fifth factor, each of said first, second, third, and fourth factors representing a different algebraic combination of four parameters, said computing means comprising: variable rotary speed driving means including a cam, a first switching circuit comprising a first single-throw single-pole switch, a first analog signal voltage applied to a first terminal of said first switch, a first resistor interposed in series circuit between said first voltage and said first terminal, said first switch operatively engaging said cam; a second switching circuit comprising like components and arranged substantially the same as said first switching circuit, a capacitor, the second terminals of said first and second switches being commonly connected to one plate of said capacitor, a third and fourth switching circuit comprising like components and arranged substantially the same as said first and second switching circuits respectively, and being similarly connected to the other plate of said capacitor, the switches of said circuits being arranged in space quadrature relation about said cam, the switches of said third and fourth switching circuits being interposed between the switches of said first and second switching circuits.

8. Analog computing means for concurrently multiplying each of a first, second, third, and fourth factor by a fifth factor, each of said first, second, third, and fourth factors representing a different algebraic combination of four parameters, said computing means comprising: variable speed rotary driving means including a cam; first, second, third and fourth switching circuits, each of said circuits comprising a switch, an analog signal voltage source connected with a first terminal of said switch and a resistor interposed in series circuit between said signal voltage and said first terminal; a capacitor, the second terminals of the switches of said first and second circuits being commonly connected to a first plate of said capacitor, the second terminals of the switches of said third and fourth circuits being commonly connected to a second plate of said capacitor, said capacitor providing a time constant with each of said resistors which is less than the shortest period of the switching frequencies at which said switches are driven, the four switches of said circuits operatively engaging said cam and being disposed thereabout in space quadrature relation, the switches of said third and fourth circuits being spaced between the switches of said first and second circuits, whereby said switches are driven in a time-quadrature relationship each with respect to the next adjacent switch, and wherein the average current in the resistor of one of said circuits is a function of the product of the frequency at which the switches are driven and the algebraic sum of a combination of said applied voltages appearing in circuit with such capacitor during a given switching cycle.

9. Analog computing means for concurrently multiplying each of a first, second, third and fourth factor by a fifth factor, each of said first, second, third and fourth factors representing a different algebraic combination of four parameters, said computing means comprising: a capacitor; a first pair of relay switching circuits comprising a first double-throw relay, a first resistor interposed in series circuit between one switch contact of said relay and a first signal voltage source, a second resistor interposed in series circuit between a second switch contact of said relay and a second signal voltage source, an armature of said first relay being connected to one plate of said capacitor; a second pair of relay switching circuits comprising like components similarly arranged substantially the same as said first pair, an armature of a second relay being similarly connected to a second plate of said capacitor; a variable frequency signal source for switching said relays, phase-shift means responsively connected to said signal source for providing first and second relay driving signals in time-phase quadrature relation to each other, said first and second relay being responsive to said second relay driving signals respectively; whereby the average current in any one resistor of the two pair of switching circuits is a function of the product of the frequency at which the switches are driven and the algebraic sum of a combination of the voltage sources appearing in circuit with said capacitor during a given switching cycle.

10. Analog computing means for concurrently multiplying each of a first, second, third and fourth factor by a fifth factor, each of said first, second, third and fourth factors representing a different algebraic combination of four parameters, said computing means comprising: a first and second double-throw switch, each having a first and second contact, an armature, and switch operating means; a variable frequency switching signal source for driving said switches; phase shift means responsively connected to said switching signal source for providing first and second switch driving signals in time-phase quadrature relation to each other, the switch operating means of said first and second switches being responsively connected to said first and second switch driving signals respectively; a first resistor interposed in series circuit between said first contact of said first switch and a first signal voltage source; a second resistor interposed in series circuit between said second contact of said first switch and a second signal voltage source; a third resistor interposed in series circuit between a third signal voltage source and said first contact of said second switch; a fourth resistor interposed in series circuit between a fourth signal voltage and said second contact of said second switch; a capacitor; the armature of said first and second switch being connected to a first and second plate respectively of said capacitor; wherein the average current in any one of the four resistors is a function of the product of the frequency at which the switches are driven and the algebraic sum of a combination of the voltage sources appearing in circuit with said capacitor during a given cycle of said switching signal source.

References Cited in the file of this patent

UNITED STATES PATENTS

| | | |
|---|---|---|
| 2,978,178 | Patterson | Apr. 4, 1961 |
| 3,058,662 | Whitesell | Oct. 16, 1962 |

UNITED STATES PATENT OFFICE
CERTIFICATE OF CORRECTION

Patent No. 3,163,751 December 29, 1964

Larry R. Millsap et al.

It is hereby certified that error appears in the above numbered patent requiring correction and that the said Letters Patent should read as corrected below.

Column 5, line 32, for "$(E_1-E_3)$" read -- $(E_3-E_2)$ --; column 10, line 51, after "said", second occurrence, insert -- first and --.

Signed and sealed this 20th day of July 1965.

(SEAL)
Attest:

ERNEST W. SWIDER
Attesting Officer

EDWARD J. BRENNER
Commissioner of Patents